United States Patent Office 3,274,638
Patented Sept. 27, 1966

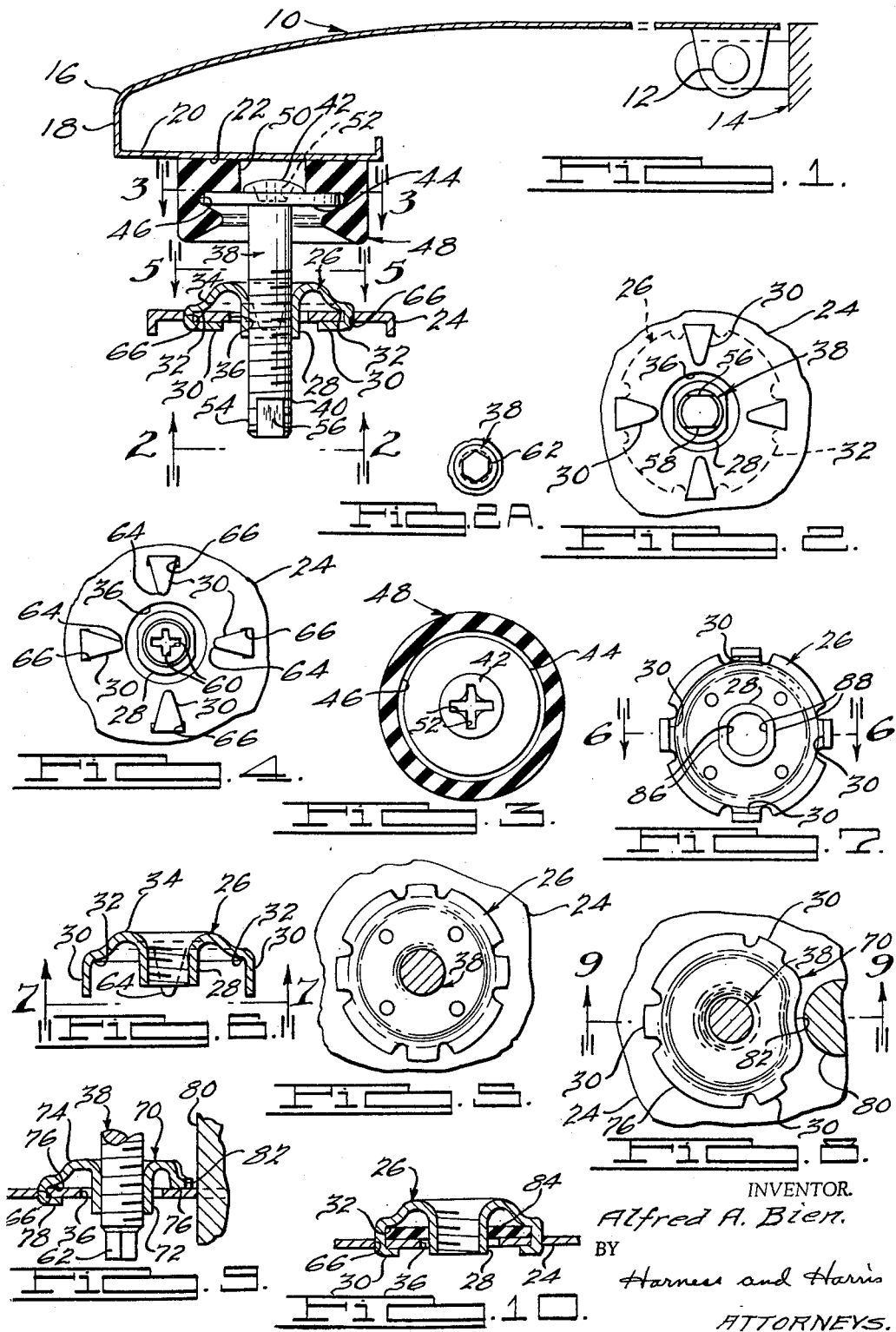

3,274,638
FASTENER ARRANGEMENT
Alfred A. Bien, Dearborn, Mich., assignor to Chrysler Corporation, Highland Park, Ill., a corporation of Delaware
Filed Aug. 8, 1963, Ser. No. 300,793
6 Claims. (Cl. 16—86)

This invention relates generally to fastener arrangements and more particularly to such fastener arrangements for adapting a relatively thin member for the reception of a screw member.

It has been accepted practice to provide resilient bumper means against which the automobile engine compartment hood panel is abutted whenever such hood panel is in locked shut position.

In order to achieve this, it has been considered necessary in the past to provide at least one nut member welded to a suitable support member which nut received an axially adjustable screw member extending vertically upwardly therefrom. The head portion of the screw, in addition to being provided with a resilient hood bumper member, contained a slot therein for engagement by a suitable driving tool such as a conventional screw driver. Further, a separate locking nut was threadedly engaged with the screw member for locking the screw against the welded nut member in order to prevent further axial movement of the screw.

The prior art arrangement described above in addition to being generally costly has a further serious disadvantage. That is, the hood panel must be properly positioned when in closed position so as to conform to the general body structure surrounding the panel in order to maintain aesthetic qualities of the vehicle. Further, because of the various tolerances necessary for the manufacturing processes, it is virtually impossible to select any one overall height for the hood bumper. Therefore, it is necessary that each vehicle have its hood bumpers selectively adjusted for height so as to achieve the desired relationship between that hood and related body structure.

With the prior art arrangement, however, such selective adjustment has been found to be a time consuming costly process. That is, with the prior art, height adjustment of the resilient hood bumper could be accomplished only by opening the hood, loosening the locking nut, inserting a screw driver into the screw head and rotating the screw so as to thereby achieve axial movement of the screw and vary the overall height of the resilient hood bumper.

The difficulty arises in that during the actual period of axial adjustment the operator does not have any way to determine the precise amount of adjustment that is required. The procedure is one of trail and error. That is, the operator must first make an adjustment, withdraw the tool and close the hood to see if the adjustment was sufficient. If the adjustment was either insufficient or excessive the operation must be repeated until the hood is finally properly positioned against the resilient bumpers. Even after the proper adjustment has been attained, the hood must be opened at least once more in order to tighten the locking nut.

In addition to the above other disadvantages exist in the prior art arrangements. For example, in an attempt to maintain manufacturing costs at a minimum, the screw-receiving nut is usually only tack welded to its associated support. Such welds when exposed to excessive vibrations or other shock impacts sometimes experience work hardening. Consequently, the welds and immediately surrounding areas of the parent metal not infrequently become relatively brittle and crack causing a failure in the general fastener arrangement.

Accordingly, it is a general object of this invention to provide a novel and improved fastener arrangement which eliminates the disadvantages of the prior art.

Another object of this invention is to provide novel and improved fastener means capable of being readily secured to an associated support member for adapting such member for the reception of a screw.

A further object of this invention is to provide novel and improved fastener means capable of being readily mechanically secured to an associated support member for adapting such member for the reception of a screw.

Other more specific objects and advantages of the invention will become apparent when reference is made to the following description and accompanying drawings wherein:

FIGURE 1 is a cross-sectional view taken generally longitudinally of a fastener arrangement, constructed in accordance with this invention, in combination with a hinged member such as an automobile engine compartment hood panel;

FIGURE 2 is a fragmentary view taken generally on the plane of line 2—2 of FIGURE 1;

FIGURE 2-A is a fragmentary view similar to FIGURE 2 and illustrating a partial modification thereof;

FIGURE 3 is a cross-sectional view taken generally on the plane of line 3—3 of FIGURE 1;

FIGURE 4 is a view similar to FIGURE 2 and illustrating another partial modification thereof;

FIGURE 5 is a view taken generally on the plane of line 5—5 of FIGURE 1 illustrating one of the elements in cross-section;

FIGURE 6 is a cross-sectional view taken generally on the plane of line 6—6 of FIGURE 7 generally illustrating one of the elements of FIGURE 1 in its pre-assembled form;

FIGURE 7 is a view taken generally on the plane of line 7—7 of FIGURE 6;

FIGURE 8 is a view similar to FIGURE 5 illustrating another embodiment of the invention;

FIGURE 9 is a cross-sectional view taken generally on the plane of line 9—9 of FIGURE 8; and FIGURE 10 is a cross-sectional view similar to FIGURE 6 but illustrating the fastener means secured in a modified manner to an associated support member.

Referring now in greater detail to the drawings, FIGURE 1 illustrates a hood panel 10 hinged as by means of a pivot member 12 to the body structure 14. The other end 16 of hood 10 may be provided with a generally downwardly depending portion 18 which carries a laterally extending portion 20 provided with an abutment surface 22 thereon.

A laterally extending support member 24 spaced from said lateral hood portion 20 carries, in secured relationship, a fastener 26 provided with a generally tubular internally threaded portion 28. The combination piercing-clamping arms 30 are formed against the lower surface of support 24 in order to secure the fastener 26 to the support.

Fastener 26, as illustrated for example by FIGURES 1, 6 and 10, is provided with a generally radially directed flange 32 which is joined to the tubular portion by a central body portion 34. Consequently arms or prongs 30 and flange 32 effectively engage opposite sides of the support 24 while body portion 34 enables the internally threaded tubular portion 28 to depend downwardly through an aperture 36 formed in support 24.

Threadably engaged with the tubular portion 28 is a screw 38 provided with an externally threaded portion 40 and a head 42. A radially extending annular flange 44 formed about screw 38 at the head end thereof is received within a generally annular recess 46 formed in the resilient abutment member 48. An opening 50 is formed in abutment 48 in order to provide a means of access to the screw head 42 and slot 52 formed therein. The other end 54 of screw 38 is also formed to provide a surface appropriate for engagement with a tool suitable for rotation of the screw 38.

Such driving surfaces may be formed as by a pair of oppositely disposed flat surfaces 56 and 58, as illustrated in FIGURES 1 and 2, or a screw driver receiving slot 60, as illustrated in FIGURE 4, or a portion of hexagonal cross section as illustrated at 62 of FIGURE 2-A. Preferably, screw 38 is formed at its lower end 54 to provide a projection of hexagonal cross-section which has its respective apexes within a circle slightly less in diameter than the minor diameter of the internally threaded portion of tubular member 28. The hexagonal portion thusly formed simplifies insertion, and initial threaded engagement, of the screw 38 into fastener 26. That is, upon entry, the hexagonal portion acts as a pilot and effectively reduces the chances of the respective threaded portions initially misengaging each other.

Prior to assembly of the fastener 26 to the support 24, the fastener is of a configuration as illustrated by FIGURES 6 and 7. The combination piercing-clamping arms 30, as viewed in FIGURE 6, depend downwardly from the flange 32 and are formed as to provide a relatively pointed end 64. In assembly, the fastener 26 and support 24 are moved relatively toward each other causing the pointed ends 64 to contact and pierce support 24 creating pierced apertures 66 accommodating prongs 30. The relative movement between fastener 26 and support 24 continues until flange 32 abuts against the upper surface of support 24. Each of the arms 30 are bent, as shown for example by FIGURES 1, 2 and 4, so as to contact the lower side of support 24 thereby completing assembly of the fastener 26 to the support 24. Aperture 36, in addition to providing clearance for tubular portion 28, also serves as a locator for the fastener 26 as it is being assembled to support. Since the location of the fastener 26 is not, in situations as illustrated, dimensionally critical, it is apparent that aperture 36 may be of a size considerably greater than the outer diameter of tubular portion 28.

FIGURES 8 and 9 illustrate a modified form of fastener 70 as being similarly comprised of an internally threaded tubular portion 72, and a central body portion 74 connecting said tubular portion 72 to a generally radially directed flange 76 which carries a plurality combination piercing-clamping arms 78. In some applications of the invention, an associated structural member 80 may prevent the use of a generally circular fastener 26 as illustrated by FIGURES 1-7. Accordingly, the fastener may be formed, as illustrated by FIGURES 8 and 9, to avoid interference with such structural members as by having portions of the fastener of reduced radial dimension as indicated generally at 82. Such fasteners, which are contoured so as to accommodate closely positioned structural members, of course retain all of the advantages of the fastener as shown by FIGURES 1-7.

At times it may be desirable to provide means whereby at least a limited amount of axial movement can be experienced by the fastener even after assembly. In order to achieve this, as shown in FIGURE 10, a relatively resilient member 84 can be inserted generally between the fastener 26 and support 24 so as to be retained between flange 32 and the support. In such cases the resilient member 84 is preferably inserted during assembly so that a certain degree of preloading of the member 84 can be achieved as the arms 30 are bent against the support 24.

The tubular portions 28 and 72 are preferably slightly deformed, as indicated generally by the somewhat flattened portions 86 and 88 of FIGURE 7, in order to cause the internally threaded portion thereof to exert a locking action on the screw thereby avoiding the necessity of a separate locking nut as employed by the prior art. Further, the entire fastener is preferably made of spring steel thereby allowing the central body portion 34 to exhibit some degree of resiliency.

With the arrangement as shown generally by FIGURE 1 it becomes possible to quickly and accurately establish the overall height of the resilient abutment (hood bumper) 48 without the necessity of employing a technique of trial and error. For example, assuming that the height of bumper 48 is insufficient for proper hood alignment, the operator need only engage a suitable tool to the lower end 54 of screw 38 and, with the hood panel in closed position, adjust the height of the screw 38 and abutment 48 until the hood assumes its proper position. Once this is achieved it is not even necessary to open the hood in order to secure the locking screw since the tubular threaded portion of the invention automatically locks the screw in any desired position.

Even though only two basic embodiments of the invention have been disclosed and described it is apparent that other embodiments and modifications of the invention are possible within the scope of the appended claims.

I claim:

1. In combination with a pivotally mounted panel member, adjustable means for abuttingly engaging a swingable end of said panel, said means comprising a support, a self-piercing nut secured to said support, said nut comprising a flange, a generally tubular threaded portion, a body portion interconnecting said flange and threaded portion, a plurality of piercing tabs formed on said flange extending through said support and formed thereagainst in order to retain said support generally between said flange and said tabs, a screw having a threaded shank portion threadably received by said tubular threaded portion and a head portion, a radially extending flange portion formed on said screw near said head, a resilient member received generally about said screw flange portion, an opening formed in said resilient member providing a means of access to said screw head for adjustment of said screw, and a tool-engaging surface formed on said shank portion for axially adjusting said screw and said resilient member so as to cause said resilient member to abut against said swingable end of said panel at a desired portion of said panel.

2. A vehicle hood bumper arrangement for abuttingly engaging the swingable end of said hood in order to maintain said swingable end in a desired position whenever said hood is closed, comprising a laterally extending support member carried by said vehicle and disposed below and spaced from said swingable end when said hood is in closed position; an aperture formed through said support; a self piercing nut having a generally radially directed flange in abutting engagement with an upper surface of said support, a convoluted body portion joining said flange and extending generally radially inwardly thereof, said body portion being formed so as to be first formed upwardly and then downwardly as said body portion progresses radially inwardly of said flange so as to provide a limited degree of flexibility in said body, a plurality of downwardly depending piercing prongs formed integrally with said flange extending through said support and bent against a lower surface of said support so as to retain said support generally between said bent prongs and said flange, and an internally threaded tubular portion joining said downwardly formed portion of said body portion depending downwardly therefrom and through said aperture; a screw having a head and a threaded shank; said screw being threadably received through said tubular portion so as to have the head projecting upwardly therefrom and the end of said threaded shank projecting downwardly therefrom; a radially extending flange portion carried by said screw near the head end thereof; a resilient abutment member carried by said screw flange portion and extending upwardly therefrom so as to abuttingly engage the swingable end of said hood, said resilient abutment member comprising a body having a generally annularly formed cavity therein for receiving said screw flange, and an opening formed generally centrally of said body for providing a means of access to said screw head; and a tool-engaging surface formed on said screw near the shank end thereof for providing a means for driving said screw and axially adjusting the position of said resilient abutment member and said swingable end of said hood.

3. In combination with a pivotally mounted panel member, adjustable means for abuttingly engaging a swingable end of said panel, said means comprising a support, a self-piercing nut secured to said support, said nut comprising a flange, a generally tubular threaded portion, a body portion interconnecting said flange and body portion, a plurality of piercing prongs formed on said flange extending through said support and formed thereagainst in order to retain said support generally between said flange and said prongs, a screw having a threaded shank portion threadably received by said tubular threaded portion and a head portion, said tubular threaded portion having a part thereof deformed so as to tightly engage said threaded shank portion in order to maintain said screw in any selected position, a radially extending flange portion formed on said screw near said head, a resilient member received generally about said screw flange portion, an opening formed in said resilient member providing a means of access to said screw head for adjustment of said screw, and a tool-engaging surface formed on said shank portion for axially adjusting said screw and said resilient member so as to cause said resilient member to abut against said swingable end of said panel at a desired position of said panel.

4. In combination with a pivotally mounted panel member, adjustable means for abuttingly engaging a swingable end of said panel, said means comprising a support, a self-piercing nut secured to said support, said nut comprising a flange, a generally tubular threaded portion, a body portion interconnecting said flange and body portion, a plurality of piercing prongs formed on said flange extending through said support and formed thereagainst in order to retain said support generally between said flange and said prongs, a screw having a threaded shank portion threadably received by said tubular threaded portion and a head portion, said tubular threaded portion having a part thereof deformed so as to tightly engage said threaded shank portion in order to maintain said screw in any selected position, a radially extending flange portion formed on said screw near said head, a resilient member received generally about said screw flange portion, an opening formed in said resilient member providing a means of access to said screw head for adjustment of said screw, a tool-engaging surface formed on said shank portion for axially adjusting said screw and said resilient member so as to cause said resilient member to abut against said swingable end of said panel at a desired position of said panel, and an additional relatively resilient member contained generally between said nut flange and said support for providing a degree of resilience therebetween.

5. In combination with a pivotally mounted panel member, adjustable means for abuttingly engaging a swingable end of said panel, said means comprising a support, a self-piercing nut secured to said support, said nut comprising a flange, a generally tubular threaded portion, a body portion interconnecting said flange end body portion, a plurality of piercing prongs formed on said flange extending through said support and formed thereagainst in order to retain said support generally between said flange and said prongs, a screw having a threaded shank portion threadably received by said tubular threaded portion and a head portion, a radially extending flange portion formed on said screw near said head, a resilient member received generally about said screw flange portion, an opening formed in said resilient member providing a means of access to said screw head for adjustment of said screw, a tool-engaging surface formed on said shank portion for axially adjusting said screw and said resilient member so as to cause said resilient member to abut against said swingable end of said panel at a desired position of said panel, and an additional relatively resilient member contained generally between said nut flange and said support for providing a degree of resiliency therebetween.

6. In combination with a pivotally mounted panel member, adjustable abutment means for abuttably determining a desired position of a swingable end of said panel member, said means comprising a support member; a self-piercing nut secured to one of said members, said nut comprising a flange, a generally tubular threaded portion, a body portion interconnecting said flange and threaded portion, a plurality of piercing tabs formed on said flange extending through said one member and formed thereagainst in order to retain said one member generally between said flange and said tabs; a screw having a threaded shank portion threadably received by said tubular threaded portion and including a head portion; a resilient abutment received generally about said screw head portion; and a tool-engaging surface formed on said screw for enabling axial adjustment of said screw relative to said one member so as to cause said resilient abutment to abut against the other of said members in order to abuttingly determine a desired position of said swingable end.

References Cited by the Examiner

UNITED STATES PATENTS

| | | | |
|---|---|---|---|
| 1,576,506 | 3/1926 | Davis | 16—86 X |
| 1,886,221 | 11/1932 | Purdy | 180—69 |
| 1,900,280 | 3/1933 | Gilmer | 180—69 |
| 2,395,788 | 2/1946 | Luxem | 16—86 X |
| 2,596,780 | 5/1952 | Meyers et al. | 16—86 |
| 2,818,901 | 1/1958 | Baker et al. | 151—41.73 |
| 2,848,272 | 8/1958 | Storch | 16—86 X |
| 2,850,934 | 9/1958 | Sehn | 85—61 X |
| 3,078,900 | 2/1963 | Walker | 151—41.73 |
| 3,093,178 | 6/1963 | Boyo | 151—41.73 |
| 3,138,987 | 6/1964 | Wing | 85—61 |

BOBBY R. GAY, *Primary Examiner.*

M. HENSON WOOD, JR., *Examiner.*

J. G. GILFILLAN, *Assistant Examiner.*

UNITED STATES PATENT OFFICE
CERTIFICATE OF CORRECTION

Patent No. 3,274,638                          September 27, 1966

Alfred A. Bien

It is hereby certified that error appears in the above numbered patent requiring correction and that the said Letters Patent should read as corrected below.

In the heading to the printed specification, line 4, for "Highland Park, Ill.," read -- Highland Park, Mich., --.

Signed and sealed this 24th day of October 1967.

(SEAL)
Attest:

Edward M. Fletcher, Jr.
Attesting Officer

EDWARD J. BRENNER
Commissioner of Patents